United States Patent Office 3,523,138
Patented Aug. 4, 1970

3,523,138
TREATMENT OF MARIGOLD PETAL MEAL TO OBTAIN A XANTHOPHYLL PRODUCT
Peter M. Grant, Rochester, N.Y., assignor to Eastman Kodak Company, Rochester, N.Y., a corporation of New Jersey
No Drawing. Filed Mar. 1, 1965, Ser. No. 436,359
Int. Cl. A23k 1/16; C07c 35/00
U.S. Cl. 260—617                          3 Claims

ABSTRACT OF THE DISCLOSURE

A process for making a xanthophyll product of enhanced coloring activity for use in poultry feed which comprises treating either marigold petal meal or a xanthopyll extract from marigold petal meal by contacting it with an aqueous solution containing alkali and an aliphatic alcohol, and then separating a xanthophyll product from the reaction mixture.

Separation can be accomplished in many ways, preferably by solvent extraction followed by distilling off the solvent and drying the product.

When a xanthophyll extract is treated, the extract is first prepared by treating the marigold petal meal with an inert organic solvent for xanthophyll, such as isopropyl ether, hexane or chloroform, and then distilling the solvent from the extract.

The xanthophyll product made by the process is also covered.

---

This invention resides in the chemical arts. More particularly, it relates to xanthophyll.

Xanthophyll, as used herein, is a generic term for certain yellow coloring matter or pigment in plants, which matter consists essentially of one or more oxygenated carotenoid compounds. As used in this specification the term includes not only one such compound alone but also a mixture of two or more such compounds.

More and more, poultry feeds are being made from materials with little or no xanthophyll content. One reason is a matter of expense. Another reason is a trend towards high energy rations. Xanthophyll, however, is a pigmenter for poultry. When ingested by poultry it results in a yellow coloration of the skin and fat, particularly noticeable in the shanks, and in highly pigmented egg yolks. Yellow skin in poultry appears to enhance marketability of broilers and the like. Highly pigmented egg yolks are in demand by manufacturers of egg noodles, yellow cake mixes and the like. Consequently, it has been proposed to supplement xanthophyll deficient, poultry feeds with edible materials having high concentrations of xanthophyll. See, for example, the French patent, No. 1,305,716, of George Dewey Lackey, Jr., which discloses such a material, namely: ground, dried petals of the yellow flower of the marigold plant, which specific material is referred to herein as marigold petal meal.

It has been found, however, that the poultry pigmenting activity of xanthophyll tends to vary according to the source from which it has been obtained. This is especially true in the case of the xanthophyll in marigold petal meal, which has been found to have poultry pigmenting activity substantially less than the maximum. It has also been found that xanthophyll having less than maximum poultry pigmenting activity, and particularly the xanthophyll in marigold petal meal, has a substantial alkali consumption value whereas xanthophyll having maximum poultry pigmenting activity has no substantial alkali consumption value.

The alkali consumption value of a material is the number of milligrams of potassium hydroride consumed by chemical reaction when 1 gram of said material is admixed with potassium hydroxide in 95% ethanol, and established and maintained at one hour at boiling temperature, the quantity of potassium hydroxide in 95% ethanol being selected so that on back titration with 0.5 N hydrochloric acid with phenophthalein as an indicator the volume of acid used is 45–55% of the volume of acid used in titrating said quantity of potassium hydroxide in 95% ethanol in the absence of said material.

A specific problem is how to increase the poultry pigmenting activity of xanthophyll in marigold petal meal.

In summary, this invention comprises various treatments of marigold petal meal to obtain xanthophyll products having greater poultry skin and egg yolk pigmenting activities than that of marigold petal meal per se.

In one process according to this invention marigold petal meal is treated with an alkali and the treated marigold petal meal is the ultimate xanthophyll product.

In another process according to this invention marigold petal meal is treated with alkali and then a xanthophyll product is separated from the treated marigold petal meal. This xanthophyll product can be used as is or further processed to a product in the form of an oil solution, an oil suspension or a dry material involving a carrier.

Still another process of this invention comprises extracting xanthophyll from marigold petal meal with such organic solvents as hexane, isopropyl ether or chloroform; and then treating the extracted xanthophyll with alkali. The treated xanthophyll can then be processed into a variety of products.

All of these processes involve the contacting of xanthophyll having a substantial, alkali consumption value with an alkali. Preferably this is done by admixing either the marigold petal meal or xanthophyll extracted therefrom with alkali preferably in the presence of a suitable organic polar liquid lower alkanol such as methanol, ethanol, isopropanol and the like. Examples of alkali are such inorganic bases as the alkali metal hydroxides such as sodium hydroxide and potassium hydroxide, and calcium hydroxide, strontium hydroxide, ammonium hydroxide, ammonia, sodium carbonate, and the like, and mixtures thereof, and such organic bases as ethylamine, morpholine, ethanolamine and the like. The alkali usually is present in aqueous solution. The quantity of alkali present is preferably at least chemically equivalent to the quantity of potassium hydroxide indicated by the alkali consumption value of the xanthophyll as well as of such other alkali consumable matter that may be present. In this connection, in addition to the xanthophyll having a substantial alkali consumption value, other matter present may have a substantial alkali consumption value. However, it is within the concepts of the processes of this invention to use greater and smaller quantities of alkali. The only maximum limitation on the quantity of alkali to be used in the tretament step in each of the processes is one of practicality.

In each of the processes the alkali treatment step is performed at a temperature generally in a range from about 0 to about 150° C. and usually in a range from about 20 to about 100° C. In preferred embodiments of the processes of this invention, where the treatment is carried out in an organic liquid, it is carried out at the reflux temperature of the organic liquid which functions as a contacting medium.

The period of time during which the alkali treatment step is performed depends in general on the temperature or temperatures at which the step is performed and on whether or not the maximum increase in poultry pigmenting activity of the xanthophyll is desired. For example, with at least a sufficient quantity of alkali present for complete treatment, treatment at 20° C. normally requires about eight hours for maximum increase in poultry pigmenting activity to occur while at about 90° C., maximum increase in poultry pigmenting activity takes place in about three hours. In general, however, a period of time in a range from about one minute to about 24 hours can be employed, although smaller and greater periods of time are within the concepts of this invention. In this connection, under the concepts of this invention, it is not necessary to have complete treatment. Partial treatment of xanthophyll with alkali results in an increase in pigmenting activity proportional to the degree of treatment. This is within the concepts of this invention as long as the increase in pigmenting activity is substantial. On the other hand, in the usual case complete treatment is preferred. The alkali treatment step can be performed in conventional equipment open to air. However, it is preferred to carry out the treatment in an inert atmosphere such as nitrogen, carbon dioxide and the like, or to carry out the treatment at reduced pressure so as to decrease the loss of xanthophyll through oxidation.

In the practice of the processes of this invention, it is within the concepts thereof to add one or more antioxidants to the material involved in any one of the treatment steps. It can be done prior to performing the process and it can be done after performance of the process. Examples of suitable antioxidants include butylated hydroxyanisole (BHA), butylated hydroxytoluene (BHT), ethoxyquin, tocopherol, lecithin and the like.

Upon termination of the alkali treatment step in the processes of this invention, preferably the reaction mixture thus obtained is subjected to further treatment, such as, for example, solvent extraction, solvent partition, partial or complete neutralization (but preferably not acidification to a pH substantially less than about 6, the preferred pH being about 6.0–8), treatment with ion exchange resins, chromatography, complex formation and the like. In those processes wherein a xanthophyll product apart from marigold petal meal is obtained, it can be incorporated into a number of liquids either by dissolution or by suspension. Suitable liquid compositions containing xanthophyll include dispersions of xanthophyll per se or of solutions of xanthophyll in vegetable and other oils, which dispersions can be established and maintained with the aid of one or more suitable surface active agents such as those well known to the art. On the other hand, in those cases where a xanthophyll product apart from marigold petal meal is obtained, the xanthophyll as such or in the form of a concentrate can be incorporated into dry products by procedures such as absorption, spray chilling, spray drying, drum drying and dispersion. Examples of absorbent materials include exfoliated hydrobiotite, calcium silicate, soybean meal and the like. Suitable carriers for spray chilled products include saturated fats such as hydrogenated tallow, hydrogenated peanut oil, hydrogenated lard, hydrogenated coconut oil, hydrogenated cottonseed oil, hydrogenated safflower oil, hydrogenated rapeseed oil and the like. Suitable carriers for spray dried and drum dried products include gelatin, acacia, starch and the like. Suitable carriers for dispersion produced products include both gelable and non-gelable colloids such as, for example, starch, gelatin, acacia, and the like.

The xanthophyll products of this invention, concentrates, dispersions or solids, are generally incorporated into poultry feed for the purpose of increasing the desirable yellow pigmentation of skin and fat of broilers and the yolks of eggs. The xanthophyll products of this invention can also be used as colorants for food intended for human consumption.

This invention is further illustrated by the following examples of various aspects thereof, including specific embodiments of the invention. This invention is not limited to these specific embodiments unless otherwise indicated.

In the examples, reference is made to ultraviolet light absorption value and to extinction recovery value. Ultraviolet light absorption value is set forth because it is an indication of xanthophyll concentration. Extinction recovery value is reported because it is an indication of yield. In this regard, extinction recovery value is equal to the number of grams of recovered material multiplied by E (1%, 1 cm., chloroform) (wave length) of recovered material multiplied by 100 divided by the number of grams of input material multiplied by E (1%, 1 cm., chloroform) (wave length) of input material.

Also, in the examples reference is made to the poultry pigmenting activity of xanthophyl.. This is determined by comparing (1) the effect (coloration of shanks or skin of chicks or coloration of the yolks of the eggs produced by laying hens) produced after feeding a definite quantity of the xanthophyll product with (2) the effect produced by feeding a molecularly equivalent quantity of pure lutein, a known, highly active, poultry pigmenting compound.

EXAMPLE 1

This example illustrates a specific embodiment of a xanthophyll product of this invention and a specific embodiment of a process for making it from marigold petal meal.

50 grams of marigold petal meal [a typical analysis of which gave an ultraviolet light absorption value of E (1%, 1 cm., chloroform) (454 m$\mu$)=12.3, an alkali consumption value of 250 and xanthophyll (which itself had a substantial alkali consumption value) with a poultry shank pigmenting activity of 38%] were warmed with 100 milliliters of 95% ethanol (95% by volume of ethanol and 5% by volume of water) 50 milliliters of 50% aqueous potassium hydroxide (50% by weight potassium hydroxide and 50% by weight of water). The resulting mixture was established and maintained at reflux temperature for 3 hours. 100 milliliters of water were added and the treated, dilute mixture thus obtained was extracted three times with 100 milliliters of ether. The ether layers obtained in the extraction steps were combined and the ether was removed by evaporation. A treated xanthophyll concentrate was thereby obtained. The yield of concentrate was 3.2 grams. The concentrate gave an ultraviolet light absorption value of E (1%, 1 cm., chloroform) (454 m$\mu$)=187. The extinction recovery value at a wave length of 454 m$\mu$ is 97%.

The poultry shank pigmenting activity of the xanthophyll in the concentrate was about 75%.

EXAMPLE 2

This example illustrates a specific embodiment of another xanthophyll product of this invention and another specific embodiment of a process for making it from marigold petal meal.

25 grams of marigold petal meal were extracted with isopropyl ether to yield a xanthophyll extract. The yield of extract was 1.79 grams. The extract had an ultraviolet light absorption value of E (1%, 1 cm., chloroform) (454 m$\mu$)=169. The extinction recovery value at 454 m$\mu$ was 98%.

0.8 gram of the extract was mixed with 2.5 milliliters of isopropanol and 0.4 milliliter of 50% aqueous sodium hydroxide. The resulting mixture was refluxed for 3 hours. Then 10 milliliters of water were added and the dilute product extracted with isopropyl ether. The material obtained after removal of the solvent was a xanthophyll concentrate. The yield of the concentrate was 0.64 gram. It had an ultraviolet light absorption value of E (1%, 1 cm., chloroform) (454 m$\mu$)=194. The extinction recovery value at 454 m$\mu$ was 92%.

EXAMPLE 3

This example illustrates another specific embodiment of the product of Example 2.

0.5 gram of the extract of Example 2 was mixed with 2 milliliters of isopropanol and 0.3 milliliter of 50% aqueous sodium hydroxide. The mixture was refluxed for 3 hours and thereafter neutralized to a pH 7 with phosphoric acid. The acid neutralized product had an ultraviolet light absorption value of E (1%, 1 cm., chloroform) (453 mμ)=160.

EXAMPLE 4

This example illustrates a specific embodiment of a process for treating marigold petal meal, and a specific embodiment of a xanthophyll product obtained thereby.

100 grams of marigold petal meal [E (1%, 1 cm., chloroform) (454 mμ)=20.4; alkali consumption value=230] were heated at reflux while stirring for 1½ hours with 500 milliliters of denatured ethyl alcohol containing 31 grams of NaOH and 20 milliliters of water. The mixture was cooled to room temperature and neutralized to a pH of 8.0 using a 50% aqueous solution of phosphoric acid ($H_3PO_4$). 0.3 gram of ethoxyquin was then added. 300 milliliters of water were added and the alcohol removed by distillation. The aqueous slurry was then spray dried using 400° F. inlet air temperature in a laboratory spray drier. The result was a finely divided, granular product. The product had an ultraviolet light absorption value of E (1%, 1 cm., chloroform) 454 mμ)=14.8. The extinction yield was approximately 95%. The poultry shank pigmenting activity was about 75%.

EXAMPLE 5

This example illustrates a specific embodiment of another process for treating marigold petal meal, and a specific embodiment of a xanthophyll product resulting therefrom.

100 grams of marigold petal meal [E (1%, 1 cm., chloroform) (454 mμ)=20.4; alkali consumption value=230] were heated at reflux while stirring with 500 milliliters of denatured ethyl alcohol containing 31 grams NaOH and 31 milliliters of water for 1½ hours. The mixture was cooled to room temperature and neutralized to pH 8.0 with a 50% aqueous solution of phosphoric acid ($H_3PO_4$). 0.3 gram ethoxyquin was added. Alcohol and water were distilled off. 500 milliliters of denatured ethyl alcohol were then added and the mixture filtered. 10.0 grams of edible tallow were added and the alcohol removed by distillation. The resulting oil phase was then admixed with an aqueous solution of acacia (30 grams acacia, 50 milliliters water) at 75° C. The resulting emulsion was drum dried and then finely divided by grinding.

The resulting, finely divided, solid product had an ultraviolet light absorption value of E (1%, 1 cm., chloroform) (454 mμ)=23.0. The poultry shank pigmenting activity was 100%. The product also showed no loss in potency after being stored 60 days at room temperature (20–25° C.).

EXAMPLE 6

This example illustrates a specific embodiment of another process for treating marigold petal meal, and a specific embodiment of a xanthophyll product made thereby.

A dry composition was prepared following the steps as described in Example 5, except the oil phase was emulsified with a food grade, modified starch product made by the pyro conversion of British gum corn with a small amount of acid for buffering, and having an ADF viscosity of 4.1–5.0. This product is marketed as Nadex 546. The emulsion was then drum dried and the resulting product ground.

The resulting, finely divided, granular product had an ultraviolet light absorption value of E (1%, 1 cm., chloroform) (454 mμ)=24.8. The poultry shank pigmenting activity was 99%. The product also showed 98.4% potency retention after being stored for 60 days at room temperature (20–25° C.).

EXAMPLE 7

This example illustrates another specific embodiment of the process of Example 6, and another specific embodiment of a xanthophyll product therefrom.

A dry composition was prepared following the steps as described in Example 6, except that the modified starch oil emulsion was spray dried instead of drum dried.

The resulting, finely divided granular, solid product had an ultraviolet light absorption value of E (1%, 1 cm., chloroform) (454 mμ)=27.8. The poultry shank pigmenting activity was 81%. The product showed 95.7% potency retention after 60 days at room temperature (20–25° C.).

EXAMPLE 8

This example illustrates still another specific embodiment of the process of Example 6, and still another specific embodiment of a xanthophyll product made thereby.

100 grams of marigold petal metal [E (1%, 1 cm., chloroform) (454 mμ)=20.4; alkali consumption value=230] were heated at reflux while stirring for 1½ hours with 500 milliliters of denatured ethanol containing 31 grams of NaOH and 31 milliliters of water. The mixture was neutralized to pH 8.0 with a 50% aqueous solution of phosphoric acid ($H_3PO_4$). 0.3 gram of ethoxyquin was added. The alcohol and water were then distilled off. 500 milliliters of denatured ethanol were then added and the mixture filtered. 5 grams of corn oil and 12 grams of finely divided exfoliated hydrobiotite were added and the solvent removed with heat while stirring.

The resulting, solid, finely divided product had an ultraviolet light absorption value of E (1%, 1 cm., chloroform) (454 mμ)=25.6. The poultry shank pigmenting activity was about 75%. The product showed a 98.2% potency retention after 60 days at 20–25° C.

EXAMPLE 9

This example illustrates a specific embodiment of still another process for treating marigold petal meal, and a specific embodiment of a xantrophyll product obtained thereby.

12.2 kilograms of marigold petal meal [E (1%, 1 cm., chloroform) (454 mμ)=20.4; alkali consumption value=230] were extracted with 215 liters of hexane at 20–25° C. with stirring for 6 hours. The mixture was filtered and the filter cake washed with 90 liters of hexane. Hexane was removed from the filtrate by distillation. An oily extract remained. Weight of the oily extract was 1.18 kilograms. The oil had an ultraviolet light absorption value of E (1%, 1 cm., chloroform) (454 mμ)=210. Extinction recovery of the oily extract=99.5%. Alkali consumption value of the extract was 90.

25 grams of degassed oil [E (1%, 1 cm., chloroform) (454 mμ)=256; alkali consumption value =85] were treated at reflux while stirring for 1½ hours with 100 milliliters of denatured ethyl alcohol containing 10 grams of NaOH and 10 milliliters of water. The mixture was neutralized to pH 8.0 with a 50% aqueous solution of phosphoric acid ($H_3PO_4$). The alcohol was removed with heat and vacuum. Ethoxyquin (1.0 gram) and 12 parts by weight of corn oil were added to the oil and the mixture was ball-milled until the size of the xanthophyll crystals was substantially less than 2.0 microns.

The product, an oil suspension of solid xanthophyll, had an ultraviolet light absorption value of E (1%, 1 cm., chloroform) (454 mμ)=15.0. The poultry shank pigmenting activity was 105%. The product showed 100% potency retention after 21 days at room temperature.

EXAMPLE 10

This example illustrates a solid product made from the product of Example 9.

1 part by weight of the oil suspension product of Example 9 was added to 1.5 parts by weight of finely divided exfoliated hydrobiotite and thoroughly mixed using heat and agitation.

The resulting, finely divided solid product had an ultraviolet light absorption value of E (1%, 1 cm., chloroform) (454 m$\mu$)=6.8. The poultry shank pigmenting activity was 66.0%.

EXAMPLE 11

This example illustrates a specific embodiment of a modification of the process illustrated by Example 9, and a specific embodiment of the product which results.

300 grams of the oily extract of Example 9 and 900 milliliters of denatured ethanol containing 90.7 grams of NaOH and 40 milliliters of water were heated for 1½ hours at reflux. 1.0 liter of water and 8.4 grams of ethoxyquin were added to the resulting mixture and it was extracted with chloroform until all of the xanthophyll had been substantially separated therefrom. The chloroform solution containing the extracted xanthophyll was then washed thoroughly with water and the chloroform removed by distillation, leaving a crystalline material consisting essentially of xanthophyll. The crystalline material had an ultraviolet absorption value of E (1%, 1 cm., chloroform)(454 m$\mu$)=334.

15 grams of the crystalline material plus 75 grams of polysorbate 80 were ball-milled together until the size of the xanthophyll crystals was substantially less than 2.0 microns. 21 grams of the ball-milled mixture were then admixed with 30 grams of finely divided exfoliated hydrobiotite and heated on a steam bath with stirring until the oil phase had been completely absorbed on the finely divided exfoliated hydrobiotite. The resulting product had an ultraviolet light absorption value of E (1%, 1 cm., chloroform)(454 m$\mu$)=20.1. The poultry shank pigmenting activity of this product was 87%.

EXAMPLE 12

This example illustrates a specific embodiment of another modification of the process illustrated by Example 9, and a specific embodiment of the resulting product.

69 grams of the ball-milled mixture of Example 11 were admixed at 75° C. with an aqueous solution of 105 grams of the modified starch product described in Example 6 and 210 milliliters of water. The resulting emulsion was spray dried, giving a finely divided, solid product. This product had an ultraviolet light absorption value of E (1%, 1 cm., chloroform)(454 m$\mu$)=11.6 and a poultry shank pigmenting activity of 81%.

Thus, this invention provides ways for treating marigold petal meal, and marigold petal meal xanthophyll products of enhanced poultry pigmenting activity.

These and other specific embodiments, features and advantages will be readily understood by those in the exercise of ordinary skill in the art after reading the foregoing disclosure. In this regard, while specific embodiments of this invention have been described in considerable detail variations and modifications of these embodiments can be effected without departing from the spirit and scope of the invention as disclosed.

I claim:

1. A process for making a xanthophyll product from marigold petal meal which comprises: (A) contacting for a period of time in a range from about one minute to about 24 hours at reflux temperature, a mixture consisting essentially of (1) marigold petal meal (2) an aqueous solution consisting essentially of alkali metal hydroxide and water, the quantity of alkali metal hydroxide present being at least substantially equivalent to the alkali consumption value of the xanthophyll in said meal and (3) a contacting medium consisting essentially of a lower alkanol, whereby a reaction mixture is formed; (B) diluting said reaction mixture with water; and (C) separating a xanthophyll product from said diluted reaction mixture by extraction with an inert solvent for xanthophyll selected from the group consisting of ether, isopropyl ether and chloroform which is immiscible with said reaction mixture, followed by separating the resulting solution and evaporating said solvent therefrom.

2. A process in accordance with claim 1 wherein said alkali metal hydroxide is potassium hydroxide, wherein said lower alkanol is ethanol, and wherein said solvent is ether.

3. A process in accordance with claim 2 wherein said contacting step is at a temperature of about 90° C. for about three hours.

References Cited

UNITED STATES PATENTS

| | | |
|---|---|---|
| 2,394,278 | 2/1946 | Wall et al. |
| 3,274,072 | 9/1966 | Burdick. |
| 3,333,962 | 8/1967 | Prebluda et al. |
| 3,069,443 | 12/1962 | Witte et al. |
| 3,258,467 | 6/1966 | Anderson et al. |
| 3,311,656 | 3/1967 | Surmatis. |

OTHER REFERENCES

Judah et al.: "Ind. & Eng. Chem.," vol. 46, pp. 2262–71 (1954).

Sadana et al.: "J. Scientific and Industrial Research," vol. VIIB, pp. 96–100 (1948).

Goodwin: Biochem. J., vol. 58, pp. 90–4 (1954).

Strain: J. Biol. Chem., vol. 123, pp. 425–37 (1938).

BERNARD HELFIN, Primary Examiner

J. E. EVANS, Assistant Examiner

U.S. Cl. X.R.

99—4, 148